United States Patent
Barth et al.

(10) Patent No.: US 6,394,260 B1
(45) Date of Patent: May 28, 2002

(54) CONVEYOR SYSTEM INCLUDING ROLLER-GUIDED CARRIAGE ASSEMBLIES

(75) Inventors: Gene M. Barth, Glendale; Robert H. Pfleger, Milwaukee, both of WI (US)

(73) Assignee: Pflow Industries, Inc., Milwaukee, WI (US)

( * ) Notice: Subject to any disclaimer, the term of this patent is extended or adjusted under 35 U.S.C. 154(b) by 0 days.

(21) Appl. No.: 09/617,477

(22) Filed: Jul. 17, 2000

(51) Int. Cl.$^7$ ................................................ B65G 17/18
(52) U.S. Cl. .................................... 198/799; 198/838
(58) Field of Search ................................ 198/799, 800, 198/845, 838, 475.1

(56) References Cited

U.S. PATENT DOCUMENTS

| | | | |
|---|---|---|---|
| 1,270,755 A | | 6/1918 | Holmberg |
| 1,412,444 A | | 4/1922 | Baker et al. |
| 1,825,950 A | | 10/1931 | Hall |
| 2,608,287 A | | 8/1952 | Mahoney et al. ............ 198/138 |
| 2,935,367 A | * | 5/1960 | Crawford ................. 198/799 X |
| 3,100,041 A | * | 8/1963 | Sheehan, Sr. ............... 198/800 |
| 3,265,193 A | * | 8/1966 | Bessant ................... 198/838 X |
| 3,515,257 A | * | 6/1970 | Smith et al. .......... 198/475.1 X |
| 3,664,482 A | | 5/1972 | Kornylak ...................... 198/20 |
| 3,887,089 A | | 6/1975 | Francis ....................... 214/16.1 |
| 4,037,715 A | | 7/1977 | Onishi et al. ................ 198/800 |
| 4,139,092 A | * | 2/1979 | Yamano ...................... 198/800 |
| 4,191,435 A | * | 3/1980 | Lehman .................. 198/799 X |
| 4,212,384 A | | 7/1980 | Gruve ......................... 198/684 |
| 4,214,848 A | | 7/1980 | Verwey et al. ................ 414/77 |
| 4,421,227 A | | 12/1983 | Kornylak .................... 190/800 |
| 4,465,177 A | | 8/1984 | Dorner ....................... 198/482 |
| 4,493,414 A | * | 1/1985 | Nevo-Hacohen ............ 198/800 |
| 4,524,863 A | | 6/1985 | Mogé ......................... 198/797 |
| 4,712,650 A | | 12/1987 | Campbell ..................... 186/41 |
| 4,729,466 A | * | 3/1988 | Bollier et al. ......... 198/475.1 X |
| 4,949,832 A | * | 8/1990 | Sansevero ............... 198/845 X |
| 4,986,411 A | | 1/1991 | Splitsoser et al. ....... 198/475.1 |
| 4,987,992 A | | 1/1991 | Pfleger ..................... 198/475.1 |
| 5,050,726 A | | 9/1991 | Flagg et al. ............. 198/475.1 |
| 5,058,729 A | * | 10/1991 | Shibata ................... 198/799 X |
| 5,101,963 A | | 4/1992 | Skarlupka et al. .......... 198/800 |
| 5,188,245 A | | 2/1993 | Mabrey ...................... 211/122 |
| 5,207,314 A | | 5/1993 | Ueda et al. ................. 198/800 |

\* cited by examiner

*Primary Examiner*—Stephen T. Gordon
*Assistant Examiner*—Patricia Engle
(74) *Attorney, Agent, or Firm*—Andrus, Sceales, Starke & Sawall, LLP (57) ABSTRACT

A conveyor system for transporting articles between various locations along a conveyor path including multiple sections extending in different directions. The conveyor system includes a conveyor roller assembly that includes an articulated conveyor body. The articulated conveyor body includes a plurality of front guide rollers and a plurality of back guide rollers. The front and back guide rollers support the carriage assembly between a tubular inner guide rail and a tubular outer guide rail. The tubular inner and outer guide rails define a conveyor path along which each of the individual carriage roller assemblies travel. Each conveyor roller assembly includes a center shaft about which the front guide rollers and rear guide rollers are independently rotatable. The center shaft is connected to a driven conveyor chain that moves each of the individual carriage roller assemblies along the conveyor path. A leveling arm connects the center shaft to a leveling chain that is driven at the same speed as the carriage chain to maintain the coupling arm at a constant position. A carriage, including a support platform, is attached to the center shaft and remains in a constant horizontal position as the individual carriage assemblies travel along the conveyor path. The articulated body of the carriage roller assembly allows the carriage roller assembly to travel around corner sections of the conveyor path while maintaining the carriage at a constant horizontal position.

16 Claims, 8 Drawing Sheets

CONVEYOR SYSTEM INCLUDING ROLLER-GUIDED CARRIAGE ASSEMBLIES

BACKGROUND OF THE INVENTION

The present invention relates to a conveyor system for transporting articles along a continuous conveyor path. More specifically, the present invention relates to a conveyor system that includes a plurality of articulated carriage roller assemblies that each travel between a pair of spaced tubular guide rails and maintain a carriage at a constant horizontal orientation as the carriage roller assembly travels along the conveyor path.

It is known to utilize material handling systems that incorporate endless members, such as chains or cables, that include a plurality of individual carriages that have platforms to support articles being moved by the conveyor system. In these type of material handling systems, a support platform of each individual carriage is held at a constant horizontal orientation to prevent the articles being supported by the carriage from falling off of the platform as the carriage is moved along both horizontal and vertical portions of the conveyor path.

Many prior art conveyor systems, such as shown in U.S. Pat. Nos. 5,207,314 and 2,608,28, include spaced roller tracks that engage rollers mounted on the carriage to guide the carriage and maintain its horizontal orientation as the carriage is transferred from a first horizontal path to a second horizontal path. In each of these above-identified patents, the roller tracks must be precisely positioned in order to ensure that the carriage platform remains at the desired horizontal orientation.

An additional problem associated with the conveyor system identified above is that each time the path of the conveyor changes direction, a roller guide track is required to ensure that the carriage platform remains in the desired, horizontal position as the direction of movement changes. In many of the prior art conveyor systems identified above, the carriage also requires a pair of roller guide tracks whenever the carriage is traveling over a path other than horizontal.

Therefore, it is an object of the present invention to provide a conveyor system that includes a plurality of individual articulated carriage assemblies that travel along the conveyor path and support the carriage at a constant horizontal orientation. It is a further object of the present invention to provide a conveyor system that includes a driven conveyor chain that is coupled to each of the individual carriage roller assemblies by a center shaft such that the orientation of the carriage mounted to the center shaft remains horizontal. Further, it is an object of the present invention to provide a conveyor system that includes a pair of tubular guide rails that defines an endless conveyor path along which the plurality of carriage roller assemblies travel.

SUMMARY OF THE INVENTION

The present invention relates to a conveyor system for transporting articles that are supported by a carriage along an endless conveyor path. Each of the carriages moving along the endless conveyor path includes a support platform that maintains a constant horizontal orientation as the carriage moves along the conveyor path. The conveyor path may include separate sections that each extend either vertically or horizontally and are joined by curved corner sections.

The conveyor system includes a plurality of individual carriage roller assemblies that travel between a pair of spaced guide rails that define the endless conveyor path. The conveyor path is defined by an inner tubular guide rail and an outer tubular guide rail that are parallel to each other and are spaced by a constant distance over the entire conveyor path.

Each of the carriage roller assemblies is positioned within the space between the inner and outer tubular guide rails. Each carriage roller assembly includes an articulated body that has a plurality of front guide rollers and a plurality of back guide rollers. A pair of the front guide rollers and a pair of the back guide rollers contact the inner tubular guide rail. A second pair of the front guide rollers and a second pair of the back guide rollers contact the outer tubular guide rail such that the front and back guide rollers support the carriage roller assembly along the inner and outer tubular guide rails as the carriage roller assembly moves along the endless conveyor path.

The articulated carriage body is jointed to allow the plurality of front guide rollers to move relative to the back guide rollers. The articulated carriage body allows the carriage roller assembly to travel around the curved corner sections of the endless conveyor path between sections of the endless conveyor path that extend in different directions.

The carriage roller assembly includes a center shaft about which the front and rear guide rollers are independently pivotable. The center shaft extends through the carriage body and is attached to a support bar of the carriage. The support bar, in turn, is connected to the platform of the carriage that is used to support the articles being transported by the conveyor system. The support bar of the carriage is securely fixed to the center shaft such that when the center shaft rotates, the support bar of the carriage rotates along with the center shaft.

The end of the center shaft opposite the carriage passes through a carriage chain. A drive assembly drives the carriage chain such that the interconnection between the carriage chain and the center shaft for each carriage roller assembly moves the carriage roller assembly along the endless conveyor path. The center shaft is rotatable relative to the carriage chain such that the orientation of the carriage mounted to the center shaft can change relative to the conveyor chain and carriage body.

The center shaft of each carriage roller assembly is connected to a leveling chain by a coupling arm. The leveling chain extends along the length of the endless conveyor path and is positioned relative to the conveyor chain such that the coupling arm maintains a constant orientation over the entire length of the conveyor path. In the preferred embodiment of the invention, the coupling arm remains vertical along the entire length of the conveyor path such that the platform of the carriage remains generally horizontal to support an article along the entire conveyor path.

A common drive assembly drives the leveling chain and the conveyor chain. Both the conveyor chain and the leveling chain pass around respective guide sprockets that maintain the desired relationship between the leveling chain and the conveyor chain.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
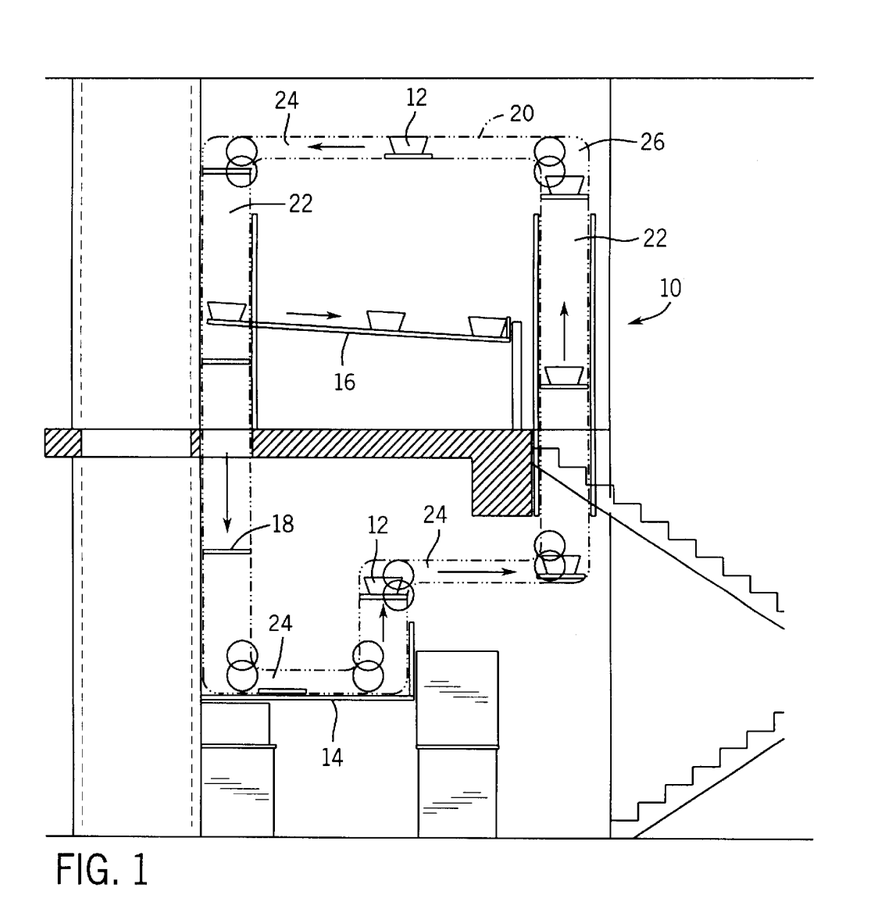
FIG. 1 is a schematic illustration of a representative installation of the conveyor system of the present invention.

Referring first to FIG. 1, thereshown is a conveyor system 10 of the present invention. The conveyor system 10 is used to move individual articles 12 between various locations in a work place. In the specific embodiment of the invention illustrated in FIG. 1, the conveyor system 10 is used to move baskets containing food between a lower, service level 14 and an upper, discharge level 16. As can be seen in FIG. 1, each of the articles 12 is supported by a carriage 18 that travels along a continuous conveyor path 20 in the direction illustrated by the arrows in FIG. 1. As can be understood in FIG. 1, the horizontal orientation of each carriage 18 must remain constant as the carriage travels along the horizontal and vertical portions of the conveyor path 20 so that the articles 12 do not fall off of the carriage 18.

In the embodiment of the invention illustrated in FIG. 1, the conveyor path 20 includes a pair of spaced vertical sections 22 and a plurality of horizontal sections 24. The horizontal sections 24 and the vertical sections 22 are joined to each other by a plurality of corner sections 26 to define the continuous conveyor path 20 that transports the articles 12 to and from their desired locations.

As discussed above, each of the carriages 18 maintain a constant horizontal orientation the carriages make the horizontal to vertical transitions around each of the corner sections 26. Although the present invention is shown as including only horizontal and vertical sections, it should be understood that each of the sections of the conveyor system 10 could be oriented at any angle between horizontal and vertical while operating within the scope of the present invention.

Figure 2:
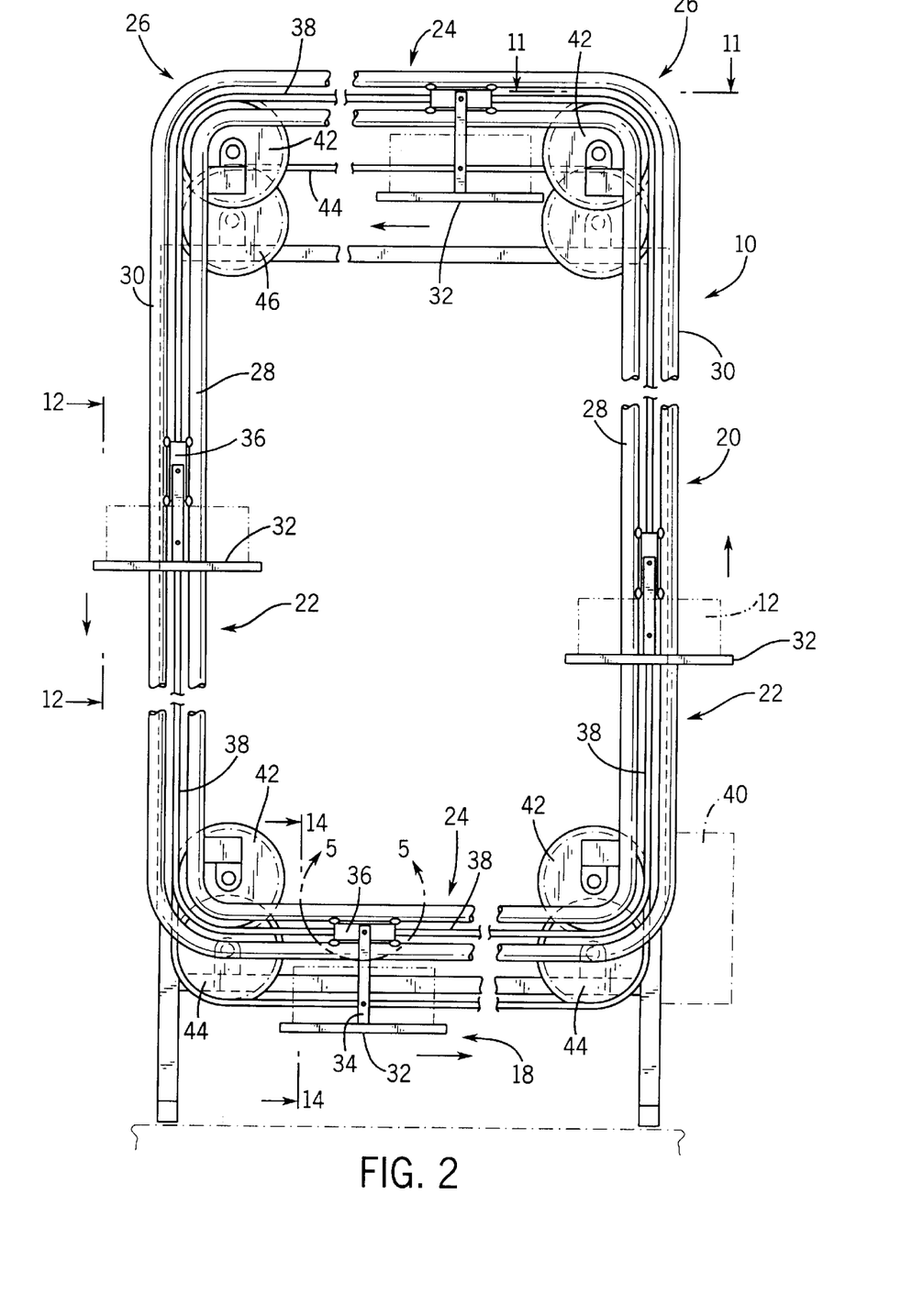
FIG. 2 is a front view illustrating representative horizontal and vertical paths for the conveyor system of the present invention.
Figure 5:
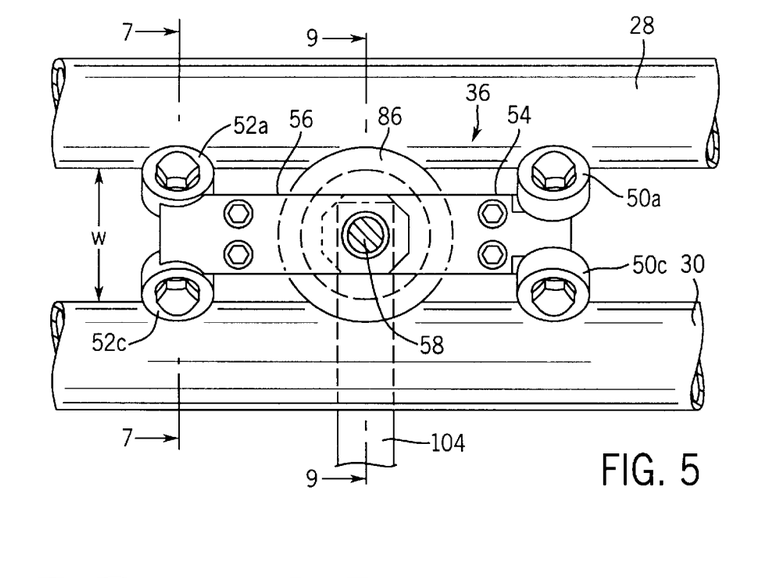
FIG. 5 is a front view illustrating the carriage roller assembly, including a plurality of guide rollers, as positioned between the tubular guide rails that define the endless conveyor path for the conveyor system.
Figures 7, 8, 9:
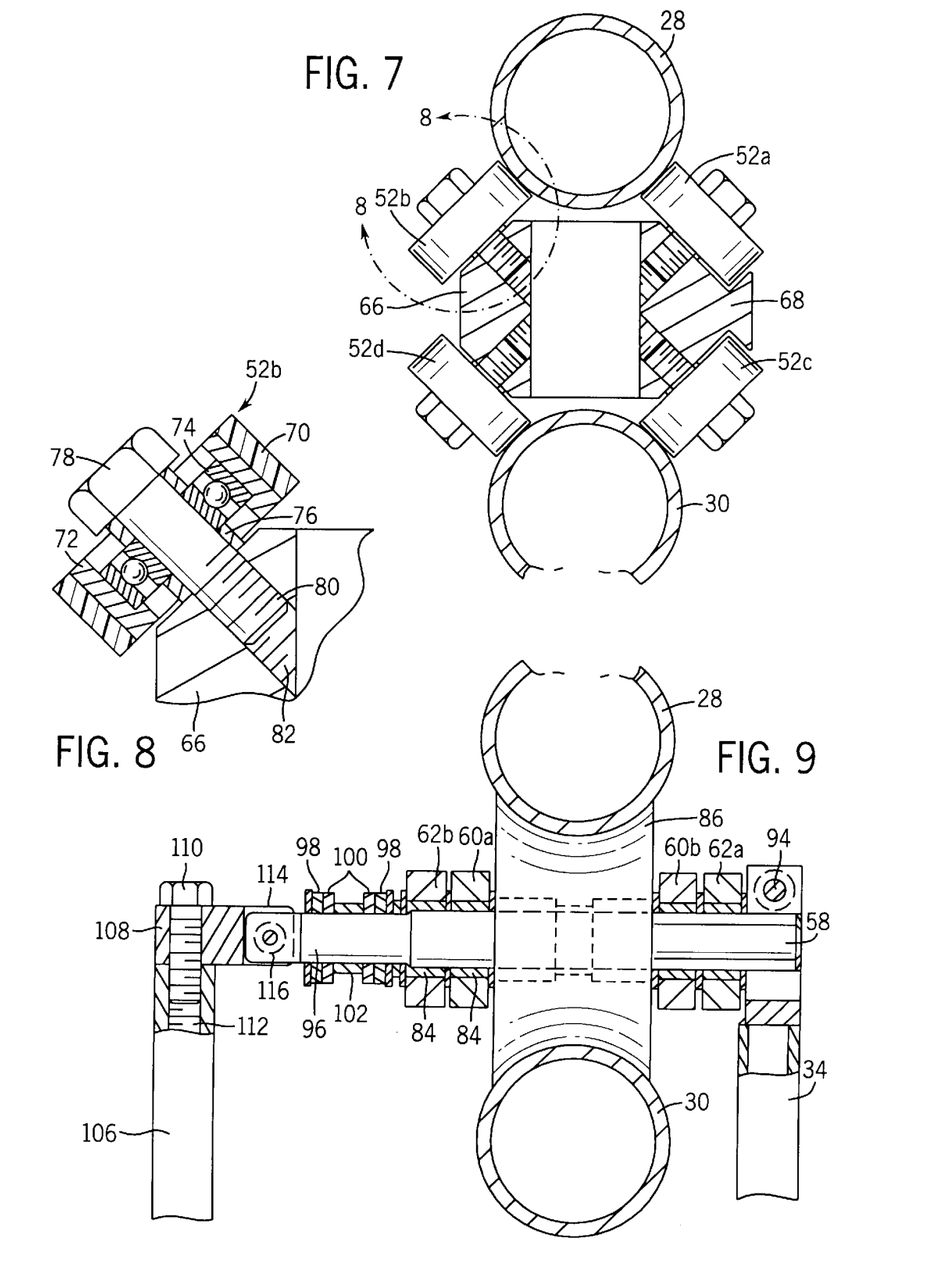
FIG. 7 is a section view taken along line 7—7 of FIG. 5 illustrating the points of contact between the carriage roller assembly and the tubular guide rails.
FIG. 8 is a section view taken along line 8—8 of FIG. 7 illustrating the rotatable mounting of one of the guide rollers.
FIG. 9 is a section view taken along line 9—9 of FIG. 5 illustrating the construction of the carriage roller assembly.

Referring now to FIG. 2, thereshown is a representative configuration for the conveyor system 10 of the present invention. The conveyor path 20 is defined by an inner guide rail 28 and an outer guide rail 30. As can be seen in FIGS. 5 and 7, both the inner guide rail 28 and the outer guide rail 30 are hollow, tubular members. The inner and outer guide rails 28, 30 are spaced from each other by a constant distance W over the entire conveyor path 20, as illustrated in FIG. 5.

Referring back to FIG. 2, each of the tubular guide rails 28 and 30 are continuous and define the vertical sections 22 and horizontal sections 24 of the conveyor path 20. The conveyor path 20 includes a plurality of corner sections 26 that join the horizontal and vertical sections to define the continuous conveyor path 20.

As can be seen in FIG. 2, each of the carriages 18 includes a horizontal platform 32 mounted to a support bar 34. The support bar 34 of each carriage 18 is mounted to a carriage roller assembly 36 that moves along the conveyor path 20 within the space between the inner guide rail 28 and the outer guide rail 30. The carriage 18, and specifically the support bar 34, is rotatably mounted to the carriage roller assembly 36 such that the platform 32 of each carriage remains generally horizontal as the carriage roller assembly 36 moves in both the horizontal and vertical directions.

As can be seen in FIG. 2, a conveyor chain 38 extends along the conveyor path 20 and is aligned with the gap between the inner and outer guide rails 28 and 30. The conveyor chain 38 is attached to each of the carriage roller assemblies 36. A drive assembly 40 drives the conveyor chain 38 such that the conveyor chain 38 moves each of the carriage roller assemblies and the attached carriage 18 along the conveyor path 20. The conveyor system 10 includes a conveyor chain guide sprocket 42 positioned at each of the corner sections 26 to guide the conveyor chain 38 as it makes the horizontal to vertical transition between the various sections of the conveyor path.

In addition to the conveyor chain 38, the conveyor system 10 includes a leveling chain 44 that extends along the conveyor path 20 adjacent to the conveyor chain 38. The leveling chain 44 is coupled to each carriage to control the horizontal orientation of each platform 32 in a manner to be described in greater detail below. The leveling chain 44 passes around a plurality of leveling chain guide sprockets 46 that are positioned to guide the leveling chain 44 between each horizontal and vertical transition within the conveyor system 10.

Figure 3:
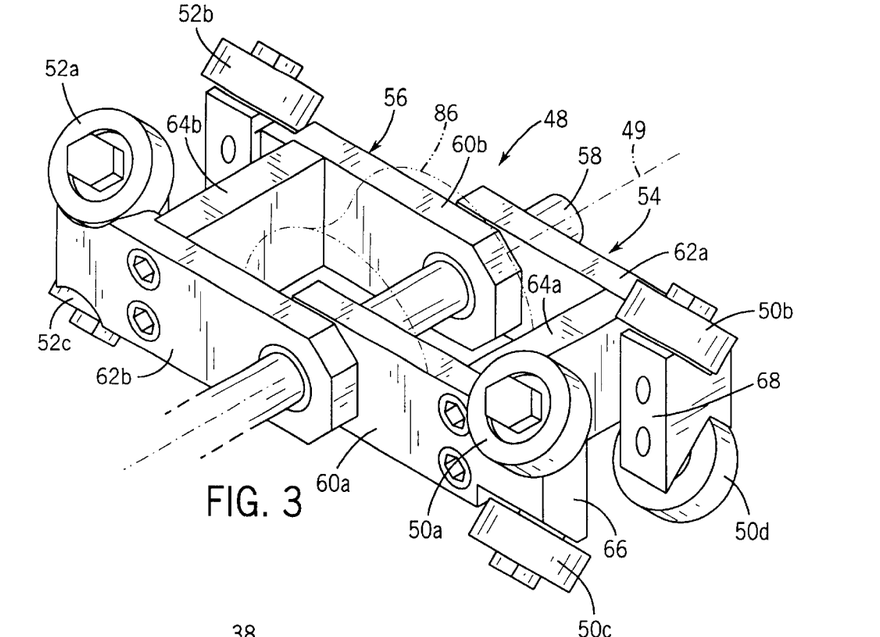
FIG. 3 is a perspective view illustrating a carriage roller assembly that forms part of the conveyor system of the present invention.

Referring now to FIG. 3, each of the carriage assemblies includes an articulated carriage body 48. The articulated carriage body 48 is centered about a pivot axis 49 and includes a plurality of front guide rollers 50a–50d and a plurality of back guide rollers 52a–52d. As can be seen in FIGS. 5 and 7, a pair of the front guide rollers (50a, 50b) and a pair of the back guide rollers (52a, 52b) contact the inner guide rail 28, while a second pair of the front guide rollers (50c, 50d) and a second pair of the back guide rollers (52c, 52d) contact the outer guide rail 30. The front and back guide rollers function to guide the carriage assembly 36 along the conveyor path 20 and support a portion of the weight of the carriage body 48 along the guide rails 28 and 30.

Figure 14:
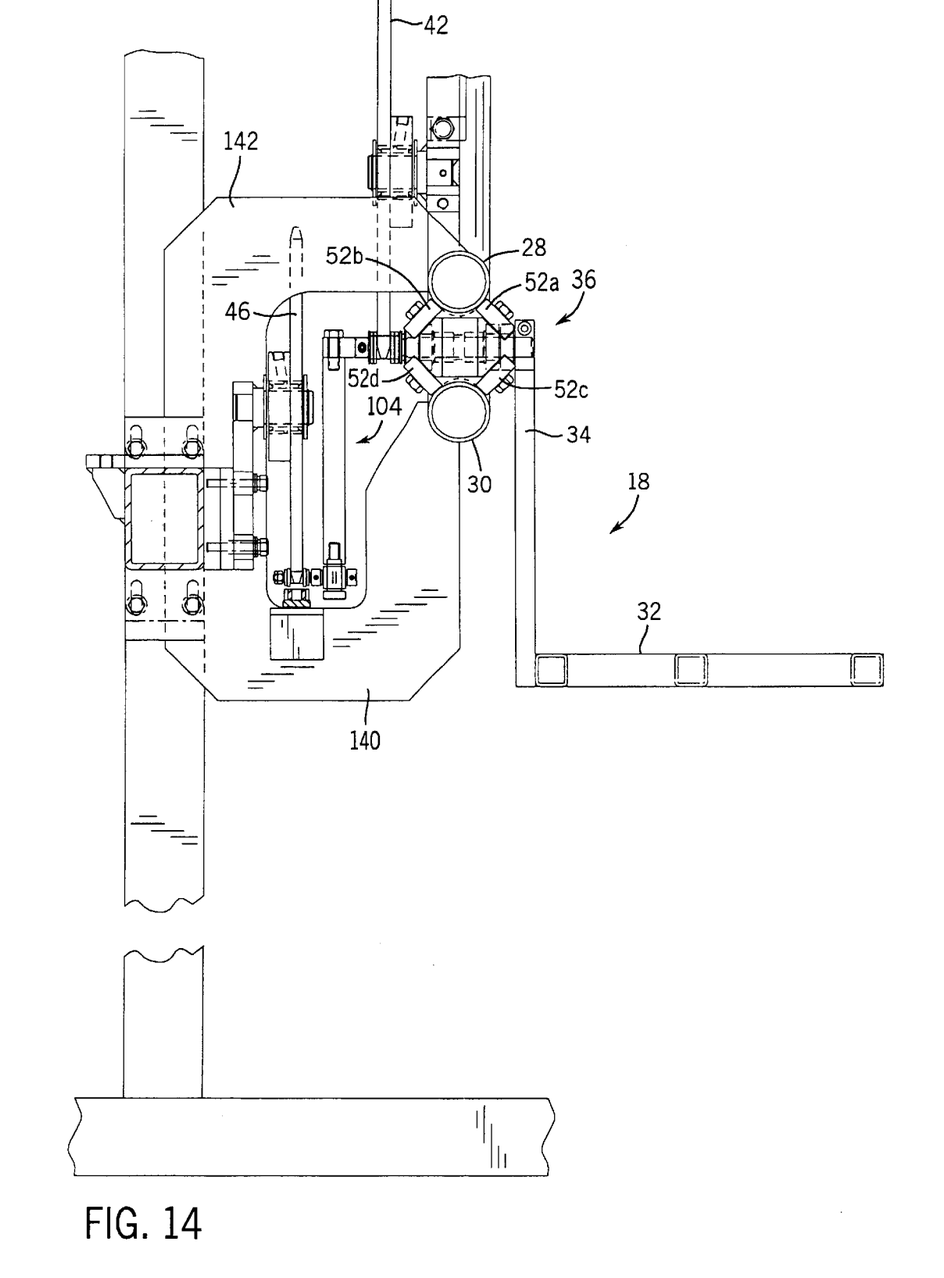
FIG. 14 is a section view taken along line 14—14 of FIG. 2.

When the carriage assembly 36 is traveling in the horizontal direction, as shown in FIG. 14, the weight of the article supported by the platform 32 causes the front guide roller 50b (not shown) and the back guide roller 52b to press into contact with the inner guide rail 28. At the same time, the diagonally opposite front guide roller 50c (not shown) and the back guide roller 52c are forced into contact with the outer guide rail 30. The contact between the front and back guide rollers and the respective guide rails supports a substantial portion of the weight of the carriage 18 along the guide rails. Thus, when the carriage roller assembly 36 is moving horizontally, a substantial portion of the weight of the carriage 18 is supported by the guide rails 28 and 30 rather than by the conveyor chain 38.

Figure 6:
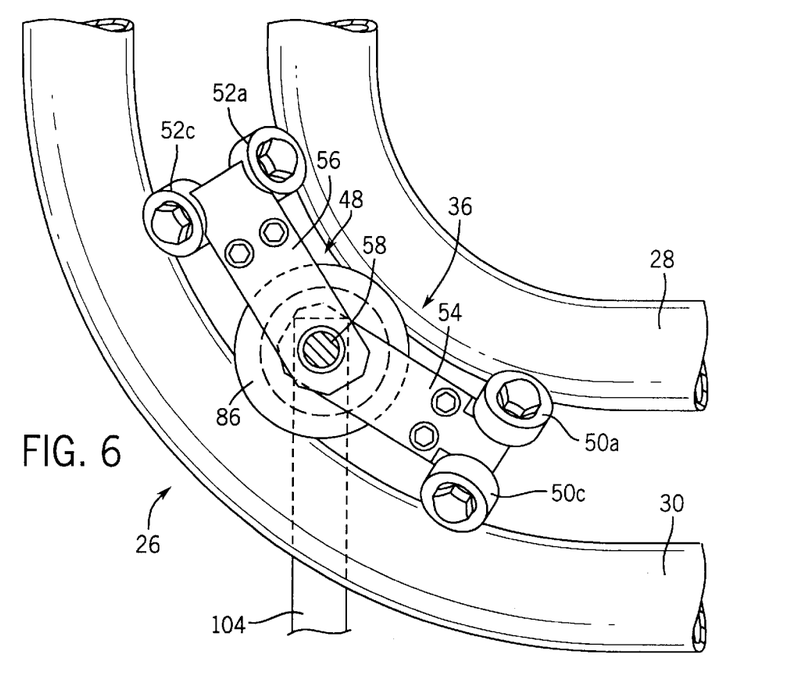
FIG. 6 is a front view illustrating the articulated movement of the carriage roller assembly as the carriage roller assembly passes around a corner section of the endless conveyor path.

Referring now to FIG. 6, as the carriage roller assembly 36 moves around one of the corner sections 26, the articulated carriage body 48 allows the front guide rollers 50 a–d and the back guide rollers 52 a–d to pivot independently about the pivot axis 49. The pivoting movement of the front and back guide rollers about the pivot axis 49 allows the articulated carriage body 40 to conform to the curvature of the corner section 26. The articulated carriage body 48 allows the corner sections 26 to have a small radius of curvature such that the horizontal to vertical transitions can occur in a smaller area. As illustrated in FIG. 6, both the inner guide rail 28 and the outer guide rail 30 are bent along a smooth curve in the corner section 26 such that the carriage roller assembly 36 can smoothly pass between the horizontal and vertical sections of the conveyor path 20.

Referring back to FIG. 3, in the preferred embodiment of the invention, the articulated carriage body 48 includes a first roller assembly 54 and a second roller assembly 56 that are each rotatably mounted to a center shaft 58. Both the first roller assembly 54 and the second roller assembly 56 are identical components and the second roller assembly 56 is inverted relative to the first roller assembly 54 prior to mounting to the center shaft 58. The second roller assembly 56 is inverted such that the back guide rollers 52 are aligned with the front guide rollers 50 such that the carriage roller assembly 36 moves smoothly along the conveyor path between the inner and outer guide rails 28 and 30.

Both the first roller assembly 54 and the second roller assembly 56 include a pair of spaced side members 60 a and b and 62 a and b that are joined by a crossbar 64 a and b. The first side member 60 a and b includes a roller mounting block 66 that supports a pair of rollers, as can be seen in FIGS. 3 and 7. The second side member 62 includes a second type of roller mounting block 68 that also supports a pair of guide rollers. The roller mounting block 66 and 68 are slightly different from each other such that the upper and lower front guide rollers are equally spaced from a centerline for the carriage body 48 such that the rollers contact the inner and outer guide rails 28 and 30 an equal distance from the centerline of both of the guide rails 28 and 30. Additionally, the different roller mounting blocks 66 and 68 allow a common component to form both the first roller assembly 54 and the second roller assembly 56, with the second roller assembly 56 being inverted relative to the first roller assembly 54.

Referring now to FIG. 8, each of the guide rollers, such as the back guide roller 52b, includes a resilient outer layer 70 mounted to an outer hub 72. A bearing assembly 74 rotatably connects the outer hub 72 to a center hub 76 that receives a mounting bolt 78. The mounting bolt 78 includes a threaded shaft 80 that is threadedly received within a threaded bore 82 formed in the roller mounting block 66. The threaded connection between the mounting bolt 78 and the roller mounting block 66 allows for easy replacement of the individual guide roller 52 a–d on the carriage body 48.

Referring now to FIGS. 3 and 6, both the first roller assembly 54 and the second roller assembly 56 are independently pivotable about the pivot axis 49 defined by the center shaft 58 such that the articulated carriage body 48 allows the carriage roller assembly 38 to conform to the corner section 26 as the carriage roller assembly 38 travels around the corner section 26. As can be seen in FIG. 9, each of the side members 60a, 60b and 62a, 62b includes a washer 84 that allows the center shaft 58 to freely rotate relative to the side members 60a, 60b and 62a, 62b.

Referring now to FIGS. 5 and 9, the carriage roller assembly 36 further includes a main roller 86 that is rotatably mounted to the center shaft 58 between the sides members of the first roller assembly 54 and the second roller assembly 56. The main roller 86 is centered between and contacts both the inner guide rail 28 and the outer guide rail 30. The main roller 86 aids in supporting the weight of the carriage and carriage roller assembly 36 along the spaced guide rails 28 and 30, particularly as the carriage roller assembly 36 travels around each corner section 26, as illustrated in FIG. 6. The main roller 86 guides the carriage roller assembly 36 along the conveyor path and aids in maintaining the position of the carriage roller assembly 36 between the spaced guide rails 28 and 30. In the preferred embodiment of the invention, the main roller 86 is formed from a resilient material to provide smooth and quiet movement of the carriage roller assembly.

Figures 4, 10:
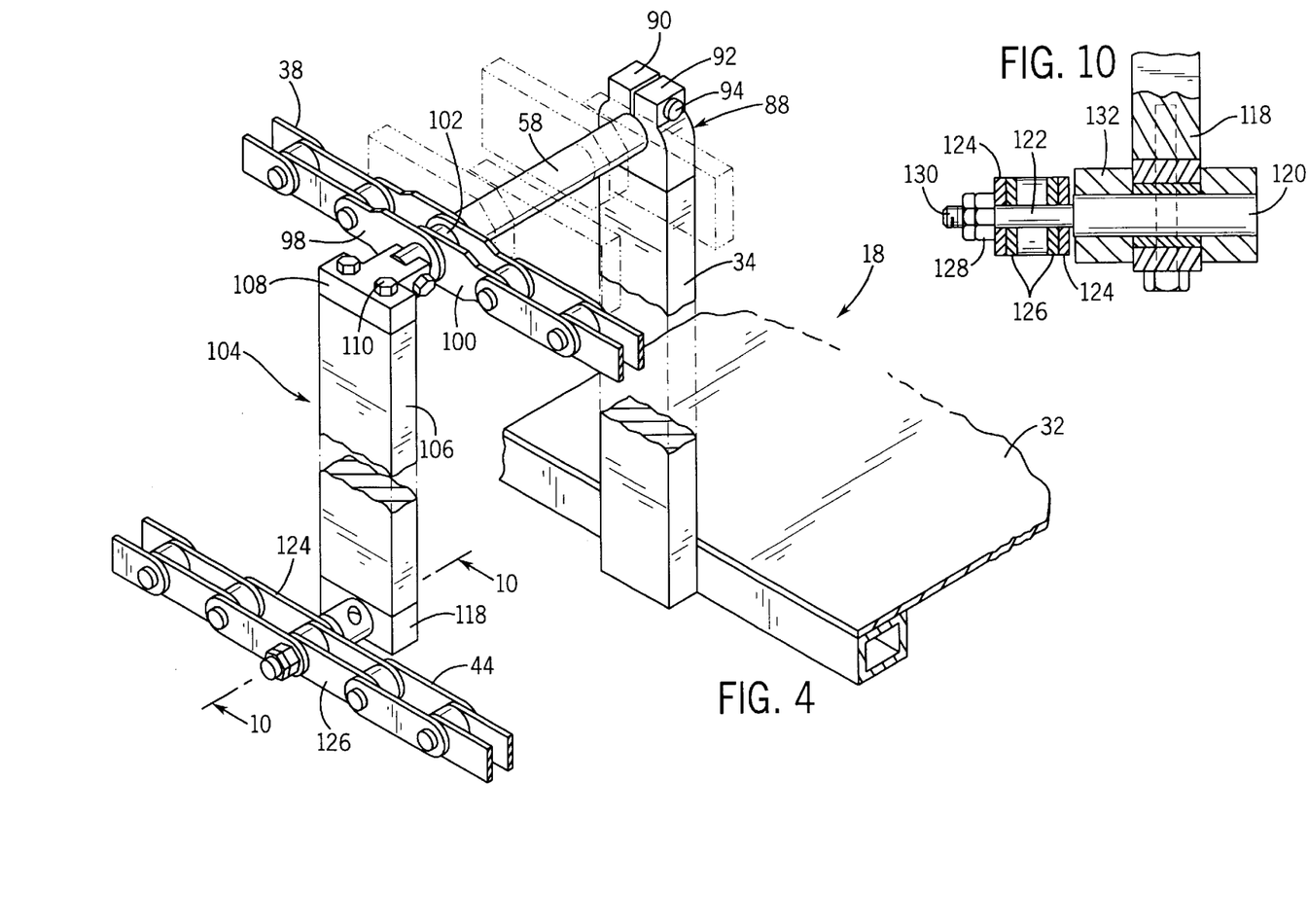
FIG. 4 is a perspective view illustrating the connection between the carriage roller assembly and a driven conveyor chain, as well as the coupling between the conveyor chain and a leveling chain.
FIG. 10 is a section view taken along line 10—10 of FIG. 4 illustrating the connection between the coupling arm and leveling chain.

Referring now to FIG. 4, the center shaft 58 of the carriage roller assembly 36 is securely attached to the support bar 34 of the carriage 18. As discussed previously, the support bar 34 is connected to a horizontal platform 32 that is used to support the articles 12 being transported by the conveyor system 10 of the present invention. As can be seen in FIGS. 4 and 9, the support bar 34 includes a clamping member 88 that includes two movable clamps 90 and 92 joined by a tightening element 94. The tightening element 94 is operable to engage the cylindrical center shaft 58 between the two clamps 90 and 92 such that the support bar 34 is securely attached to the center shaft 58. The support bar 34 is fixed to the center shaft 58 such that the support bar 34 rotates along with the center shaft 58.

Referring back to FIG. 4, the center shaft 58 is coupled to the conveyor chain 38. As discussed previously, the conveyor chain 38 is driven by a drive assembly and provides the required force to move the individual carriage assemblies along the conveyor path. Referring now to FIG. 9, the center shaft 58 includes a reduced diameter portion 96 that passes through a pair of chain links 98 and 100 that form a portion of the conveyor chain 38. A sleeve 102 surrounds the reduced diameter portion 96 of the center shaft 58 between the portions of the innermost chain link 100. The sleeve 102 reduces the wear to the center shaft 58 as the center shaft passes around the individual conveyor chain guide sprockets 42 positioned in the corner sections of the conveyor path, as illustrated in FIG. 14.

Referring back to FIG. 4, the center shaft 58 passes through the chain links 98 and 100 and is connected to a coupling arm 104. The coupling arm 104 is perpendicular to the center shaft 58 and is connected to the leveling chain 44. The connection of the coupling arm 104 to the leveling chain 44 controls the rotation of the center shaft 58, and thus the horizontal position of the platform 32, as the conveyor roller assembly travels along the conveyor path.

The coupling arm 104 includes a main body portion 106 joined to an upper attachment member 108. Attachment member 108 is connected to the main body 106 of the coupling arm 104 by a pair of connectors 110 that are threadedly received within internally threaded bores formed in the body 106.

As shown in FIG. 9, the upper attachment member 108 extends laterally from the body 106 and includes an attachment portion 114 that is received within a clevis 116 formed on the outermost end of the center shaft 58. The clevis 116 and the attachment portion 114 securely engage each other such that when the coupling arm 104 rotates, the rotation of the coupling arm 104 is directly transferred to the center shaft 58. As previously discussed, the center shaft 58 is securely attached to the support bar 34 such that rotation of the coupling arm 104 will result in rotational movement of the platform 32.

Referring back to FIG. 4, the second end of the coupling arm 104 includes a lower attachment portion 118. As can be seen in FIG. 10, an attachment shaft 120 passes through the lower attachment portion 118. The attachment shaft 120 includes a reduced diameter portion 122 that passes through a pair of links 124 and 126 of the leveling chain 44. A nut 128 receives a threaded portion 130 of the attachment shaft 120 to prevent the leveling chain 44 from sliding off of the attachment shaft 120. A spacer 132 surrounds the attachment shaft 120 and provides the required spacing between the lower attachment portion 128 and the leveling chain 44.

As can be understood in FIGS. 4 and 10, the attachment shaft 120, and specifically the reduced diameter portion 122, is freely rotatable with respect to the links 124 and 126 of the leveling chain 44. Thus, when the position of the leveling chain 44 changes relative to the position of the conveyor chain 38, the coupling arm 104 rotates the center shaft 58 and thus changes the horizontal orientation of the platform 32.

Figures 12, 13:
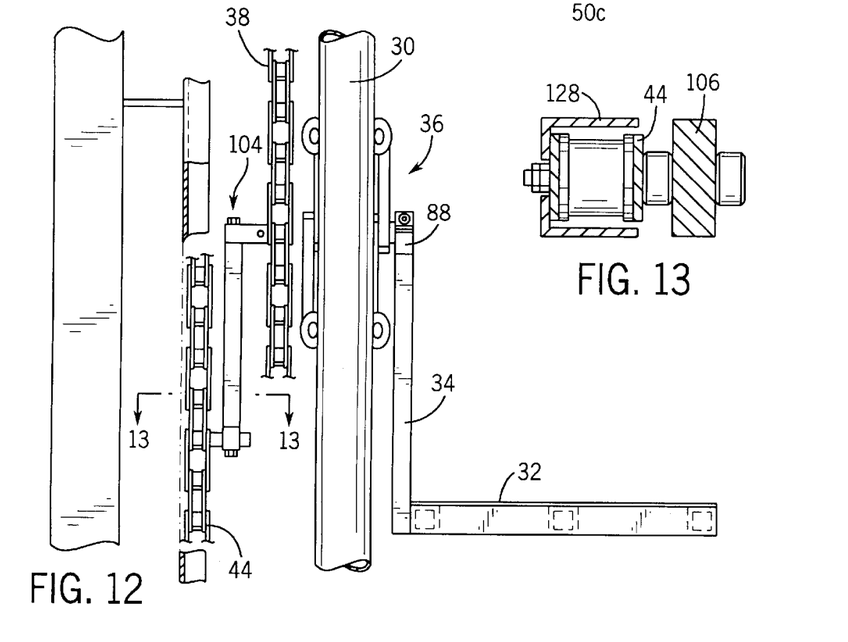
FIG. 12 is a view taken along line 12—12 of FIG. 2.
FIG. 13 is a partial section view taken along line 13—13 illustrating the connection between the coupling arm and the leveling chain.

Referring now to FIG. 13, the leveling chain 44 is surrounded by a shield member 128 that protects the leveling chain 44 as it travels along side the continuous conveyor path.

Figure 11:
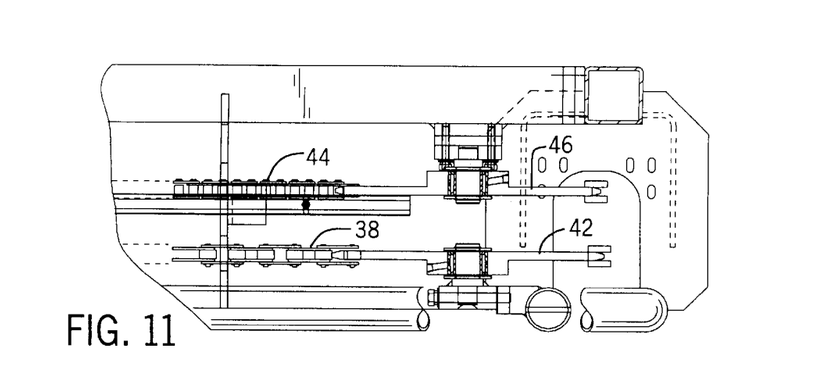
FIG. 11 is a view taken along line 11—11 of FIG. 2 illustrating the orientation of the conveyor chain and leveling chain.

Referring now to FIGS. 11 and 12, the conveyor chain 38 and the leveling chain 44 are spaced laterally from each other by the width of the leveling arm 104. When the carriage roller assembly 36 is moving vertically, as illustrated in FIG. 12, the connection of the coupling arm 104 to the leveling chain 44 is positioned vertically beneath the connection between the coupling arm 104 and the center shaft 58 of the carriage roller assembly 36. Thus, the support bar 34 is held in a vertical position by the leveling chain 44 and the coupling arm 104 such that the attached platform 32 maintains a constant horizontal orientation.

As shown in FIG. 14, when the leveling arm 104 reaches one of the corner sections of the conveyor path, the leveling chain 44 passes around the leveling chain guide sprocket 46 while the conveyor chain 38 passes around the conveyor chain guide sprocket 42. The leveling chain guide sprocket 46 is positioned below the conveyor chain guide sprocket 42 by the length of the coupling arm 104.

Figure 15:
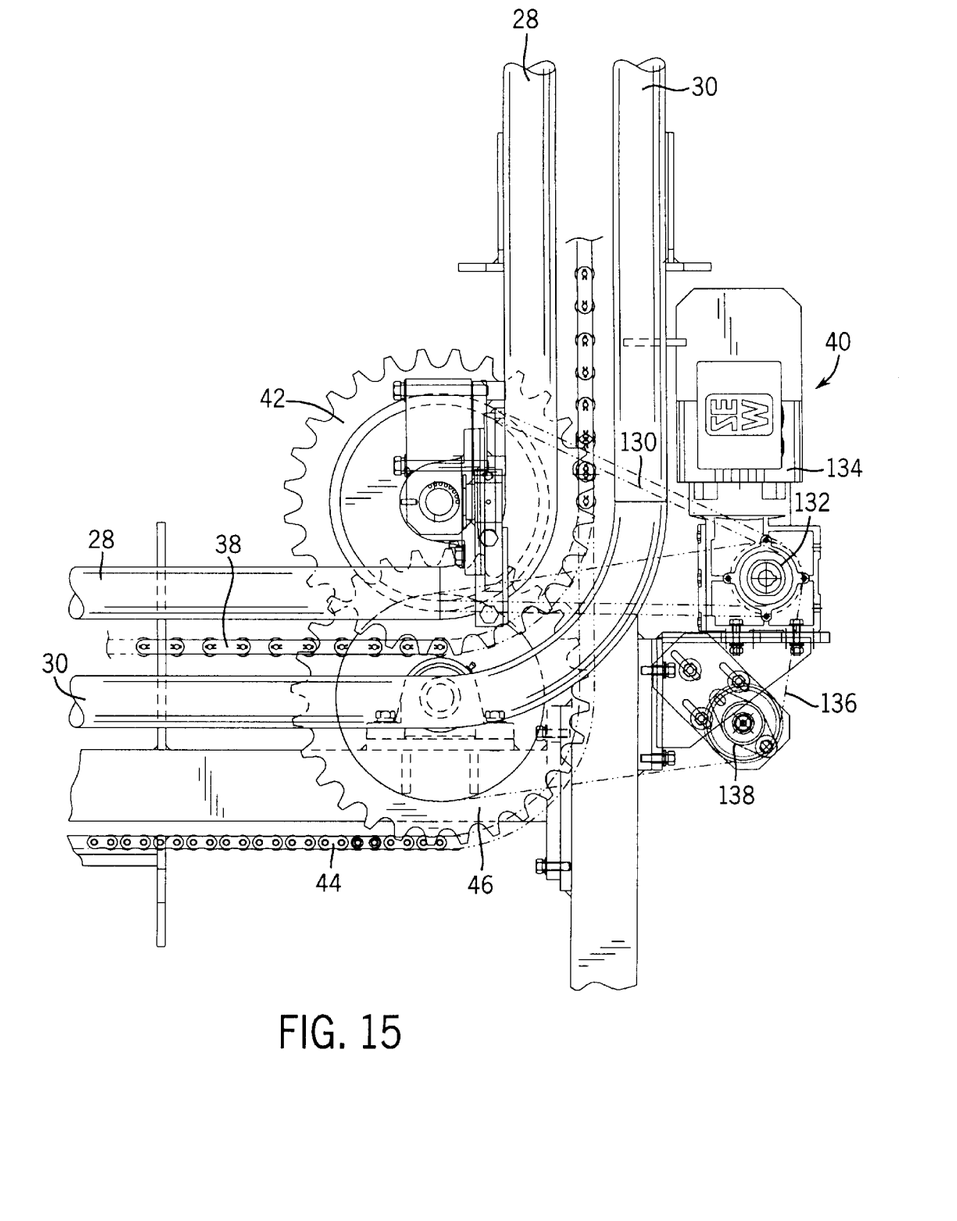
FIG. 15 is a front view of the drive assembly used to drive both the conveyor chain and the leveling chain of the present invention.

Referring now to FIG. 15, thereshown are the conveyor chain guide sprocket 42 and the leveling chain guide sprocket 46 that guide the conveyor chain 38 and leveling chain 44 from a horizontal section of the conveyor path to a vertical section of the conveyor path. The axis of rotation for the conveyor chain guide sprocket 42 and axis of rotation of the leveling chain guide sprocket 46 are vertically aligned with each other such that the leveling chain 44 is aligned behind the conveyor chain 38 when the chains are traveling in the vertical direction, as can be seen in FIG. 12.

Referring back to FIG. 15, one of the conveyor chain guide sprockets 42 is connected to the drive assembly 40 by a drive chain 130. The drive chain 130 passes around a gear assembly 132 that is connected to an electric drive motor 134. The electric drive motor 134 is operated at a selected speed and rotates the gear assembly 132. As can be seen in FIG. 15, the leveling chain guide sprocket 46 is also connected to the gear assembly 132 by a drive chain 136. In addition to passing around the gear assembly 132, the drive chain 136 passes around a guide member 138 to aid in maintaining tension on the drive chain 136. The common connection between both the drive chain 130 and the drive chain 136 to the single gear assembly 132 ensures that both the conveyor chain guide sprocket 42 and the leveling chain guide sprocket 46 rotate at a common speed. Thus, both the conveyor chain 38 and the leveling chain 44 travel at the same speed around the entire conveyor path.

As can be seen in FIG. 2, the length of the conveyor chain 38 and the length of the leveling chain 44 are identical and are driven at the same speed by a common drive assembly 40. Thus, the relationship between the conveyor chain 38 and the leveling chain 44 remains constant such that the coupling arm 104 can maintain the platform 32 at a constant horizontal orientation.

Referring now to FIG. 14, the upper and lower guide rails 28 and 30 are supported in their desired location by a pair of mounting brackets 140 and 142. The mounting brackets 140 and 142 are attached to the portion of the individual guide rail away from the point of contact between the front and back guide rollers and the respective inner guide rail 28 and outer guide rail 30. The configuration of the mounting brackets 140 and 142 allow the carriage roller assembly 36 to travel along the entire continuous conveyor path without contacting any of the supporting structure for the inner and outer guide rails 28 and 30.

As can be understood in FIGS. 2 and 15, the orientation of the leveling chain guide sprocket 46 relative to the conveyor chain guide sprocket 42 is important in maintaining the proper relationship between the conveyor chain 38 and the leveling chain 44. The proper orientation between the conveyor chain 38 and the leveling chain 44 maintains the coupling arm 104 in a general vertical position, such that the platform 32 remains generally horizontal.

Although the present invention has been described as including vertical and horizontal sections, the articulated configuration of the carriage roller assembly 36 and the rotating connection between the center shaft 54 and the carriage roller assembly 36 allows the conveyor path to be angled at almost any orientation as long as the conveyor chain 38 and the leveling chain 44 maintain the proper spacing to keep the coupling arm 104 vertical. Typically, the conveyor system requires a leveling chain guide sprocket 46 and a conveyor chain guide sprocket 42 at the transition between sections of the conveyor path that extend in different directions, as can be seen in FIG. 1. The positioning of the respective guide sprockets maintains the proper spacing between the conveyor chain 38 and the leveling chain 44 such that the coupling arm 104 remains vertical. Thus, the number of configurations for the conveyor system of the present invention is nearly unlimited and the conveyor system 10 can thus be configured based on the specific needs of the owner.

Various alternatives and embodiments are contemplated as being within the scope of the following claims particularly pointing out and distinctly claiming the subject matter regarded as the invention.

We claim:

1. A conveyor system for transporting articles, the conveyor system comprising:
    an endless conveyor path defined by an inner tubular guide rail and an outer tubular guide rail, the inner and outer tubular guide rails being parallel to each other and spaced from each other by a constant distance over the entire conveyor path;
    a plurality of carriage roller assemblies for traveling along the endless conveyor path between the inner and outer guide rails, each of the carriage roller assemblies including:
        a first roller assembly having a pair of inner guide rollers positioned to guide the carriage roller assembly along the inner guide rail and a pair of outer guide rollers positioned to guide the carriage roller assembly along the outer guide rails;
        a second roller assembly rotatably connected to the first roller assembly, the second roller assembly having a pair of inner guide rollers positioned to guide the carriage roller assembly along the inner guide rail and a pair of outer guide rollers positioned to guide the carriage roller assembly along the outer guide rails;
        a center shaft extending through the first roller assembly and the second roller assembly, the first roller assembly and the second roller assembly being independently rotatable about the center shaft; and
        a carriage mounted to the center shaft, the carriage including a deck to support the articles being transported;
        a conveyor chain extending parallel to the endless conveyor path and connected to the center shaft of each conveyor roller assembly, the conveyor chain being driven to move the attached carriage roller assemblies along the conveyor path.

2. The conveyor system of claim 1 wherein each carriage roller assembly further comprises a main roller rotatable about the center shaft and positioned to contact both the inner guide rail and the outer guide rail as the carriage roller assembly moves along the endless conveyor path.

3. The conveyor system of claim 1 further comprising a leveling chain arranged adjacent to the conveyor chain, the center shaft of each carriage roller assembly being coupled to the leveling chain by a coupling arm such that the coupling arm rotates the center shaft to maintain the carriage deck at a constant horizontal orientation as the carriage roller assembly moves along the entire endless conveyor path.

4. The conveyor system of claim 3 wherein the center shaft passes through the conveyor chain and is rotatable relative to the conveyor chain.

5. The conveyor system of claim 4 wherein the leveling chain and the conveyor chain are driven at the same speed.

6. The conveyor system of claim 1 wherein the conveyor path includes at least a first section and a second section, the first and second sections extending in different directions and being joined by a corner section.

7. The conveyor system of claim 6 wherein the first roller assembly and the second roller assembly rotate about the shaft independently to guide each carriage roller assembly around the corner section and along the first and second conveyor sections.

8. The conveyor system of claim 7 wherein the first section of the endless conveyor path is horizontal and the second section of the endless conveyor path is vertical.

9. The conveyor system of claim 8 wherein one of the inner guide rollers on both the first roller assembly and the second roller assembly contact the inner guide rail and one of the outer guide rollers on both the first roller assembly and the second roller assembly contact the outer guide rail to support a portion of the weight of the carriage when the carriage roller assembly is traveling along the horizontal section of the endless conveyor path.

10. A conveyor system for transporting articles, the conveyor system comprising:
    an endless conveyor path defined by an inner tubular guide rail and a parallel outer tubular guide rail, the inner and outer guide rails being spaced from each other by a constant distance over the entire endless conveyor path, the endless conveyor path including at least a first section and a second section each extending in different directions, the first and second conveyor sections being joined by a corner section;
    a plurality of carriage roller assemblies for traveling along the endless conveyor path between the inner and outer guide rails, each conveyor roller assembly including an articulated body centered about a pivot axis, the articulated body having a plurality of front guide rollers and a plurality of back guide rollers that contact the inner and outer guide rails to support the carriage roller assembly therebetween, the plurality of front guide rollers and the plurality of back guide rollers being independently pivotable about the pivot axis;
    a conveyor chain extending parallel to the endless conveyor path and connected to the articulated body of each carriage roller assembly, the conveyor chain being driven to move the carriage roller assemblies along the conveyor path; and
    a carriage mounted to each carriage roller assembly for supporting an article being transported by the conveyor system;
    wherein the articulated body of each carriage roller assembly allows the plurality of front guide rollers to pivot about the pivot axis and travel around the corner section independently of the plurality of rear guide rollers.

11. The conveyor system of claim 10 wherein a pair of the front guide rollers and a pair of the back guide rollers contact the inner guide rail and a pair of the front guide rollers and a pair of the back guide rollers contact the outer guide rail.

12. The conveyor system of claim 10 wherein the plurality of front guide rollers and the plurality of back guide rollers are independently rotatable about a center shaft that defines the pivot axis, the center shaft being connected to the conveyor chain.

13. The conveyor system of claim 12 wherein each carriage roller assembly further comprises a main roller rotatably mounted around the center shaft and positioned to contact both the inner guide rail and the outer guide rail as the carriage roller assembly moves along the endless conveyor path.

14. The conveyor system of claim 12 further comprising a leveling chain arranged adjacent to the conveyor chain, the center shaft of each carriage roller assembly being coupled to the leveling chain by a coupling arm such that the coupling arm rotates the center shaft to maintain the carriage at a constant horizontal orientation as the carriage roller assembly moves along the entire endless conveyor path.

15. The conveyor system of claim 14 wherein the leveling chain and the conveyor chain are driven at the same speed.

16. The conveyor system of claim 10 wherein the first section of the endless conveyor path is horizontal and the second section of the endless conveyor path is vertical.

* * * * *